Jan. 23, 1940.　　　　F. J. RAMSEY　　　　2,188,233
AUTOMATIC TRANSMISSION
Filed Nov. 9, 1937　　11 Sheets-Sheet 1
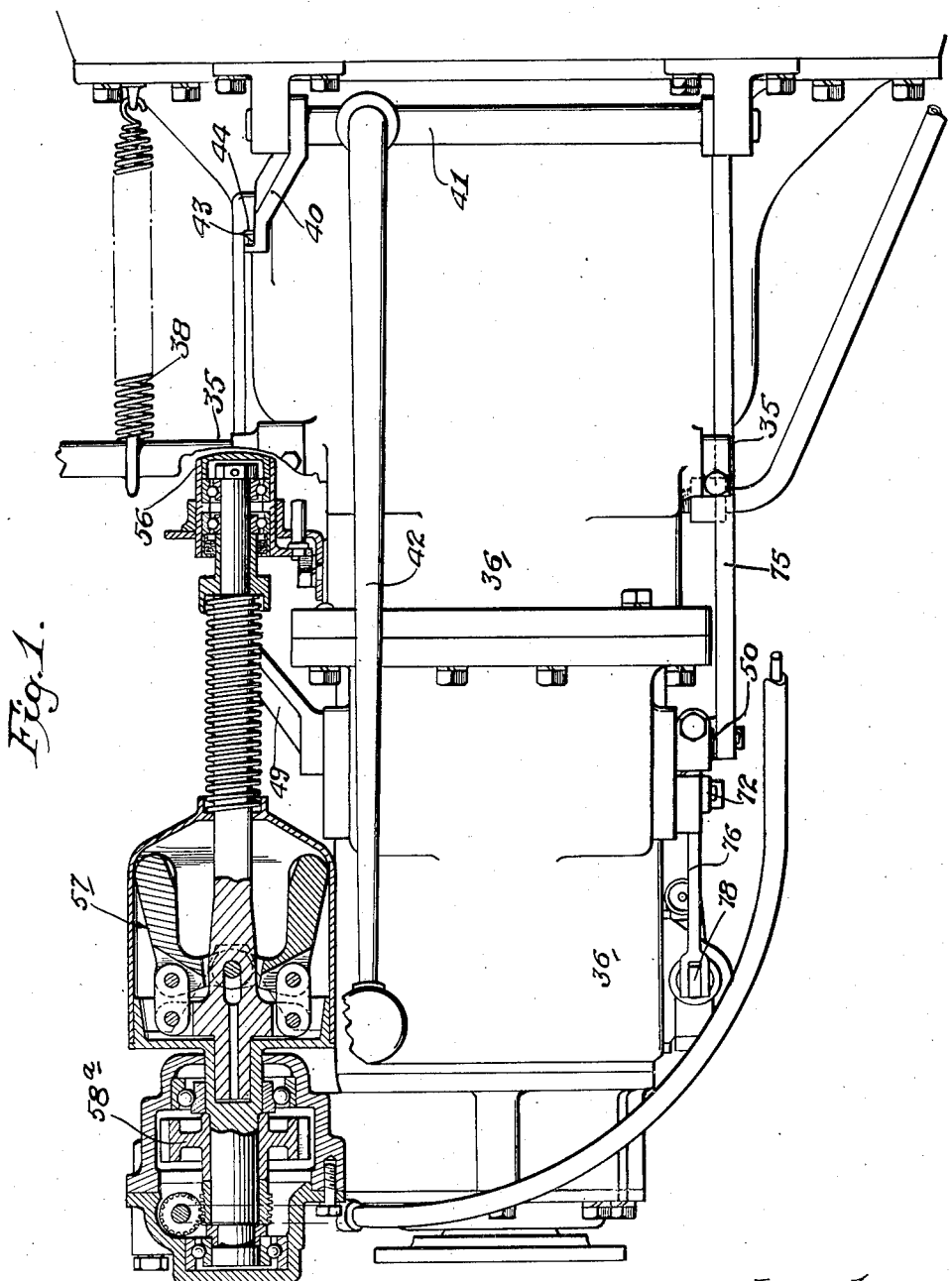
Inventor:
Fred. J. Ramsey
by his Attorneys
Howson & Howson

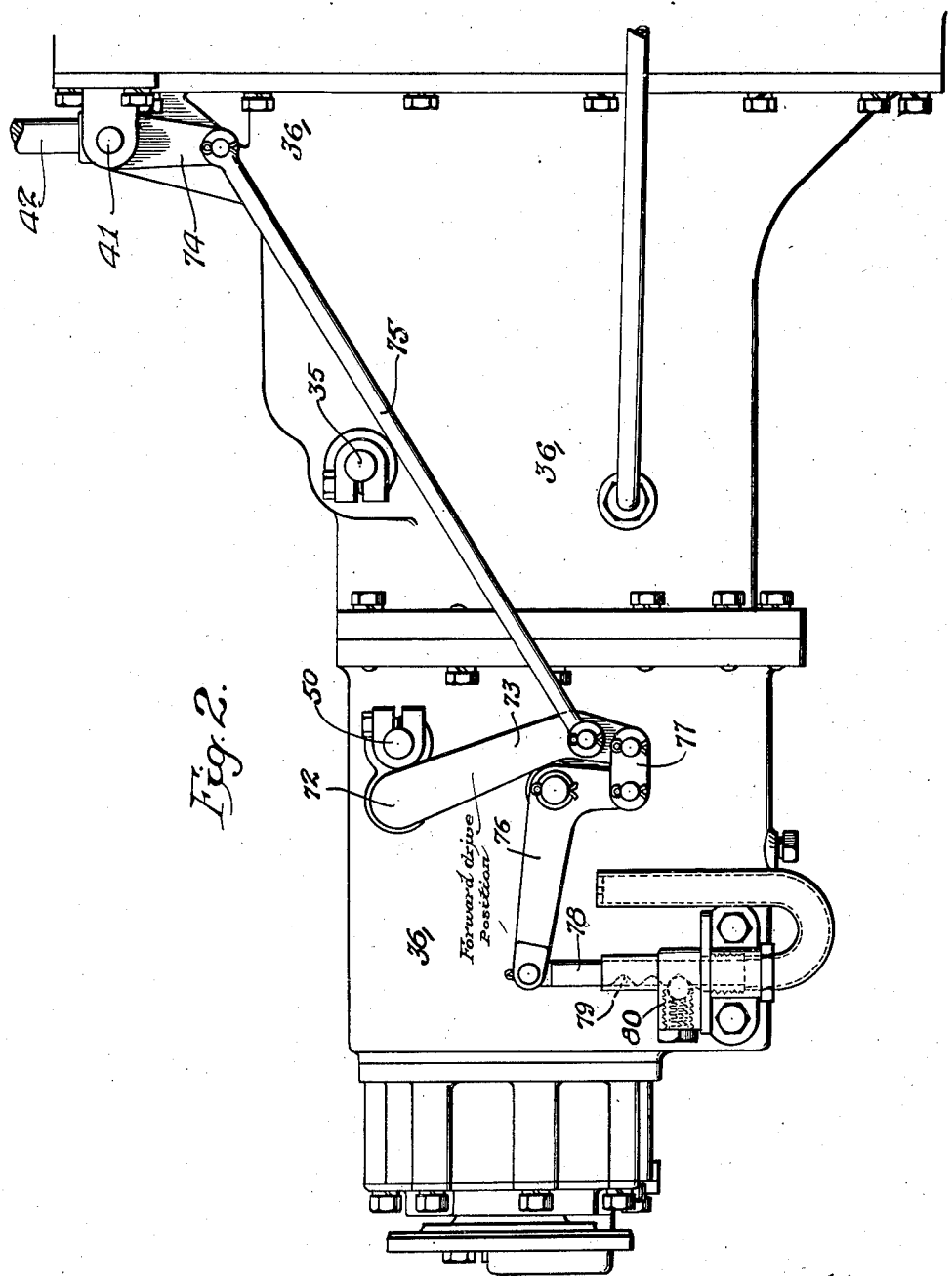

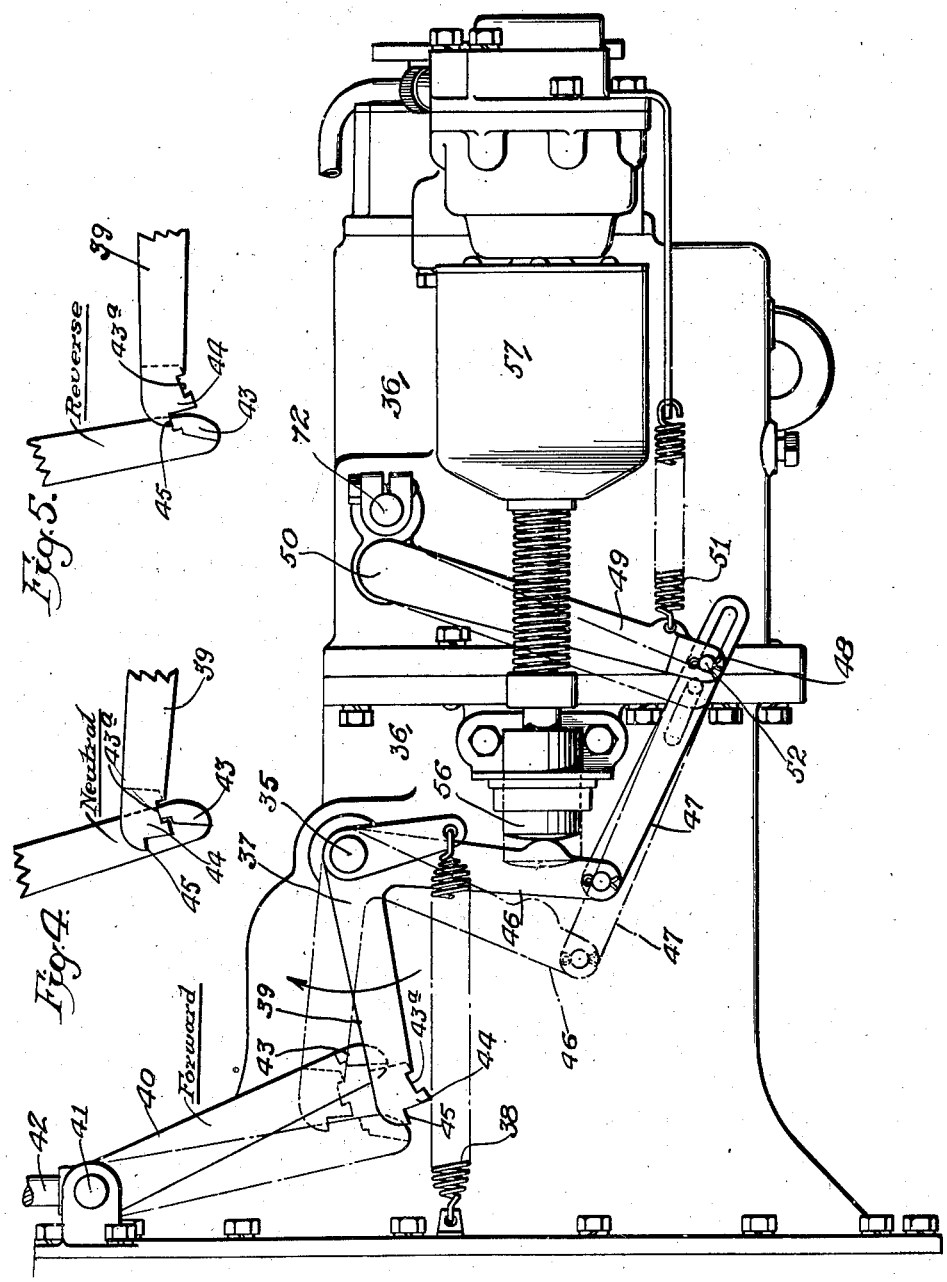

Jan. 23, 1940.　　　　F. J. RAMSEY　　　　2,188,233
AUTOMATIC TRANSMISSION
Filed Nov. 9, 1937　　　11 Sheets-Sheet 4
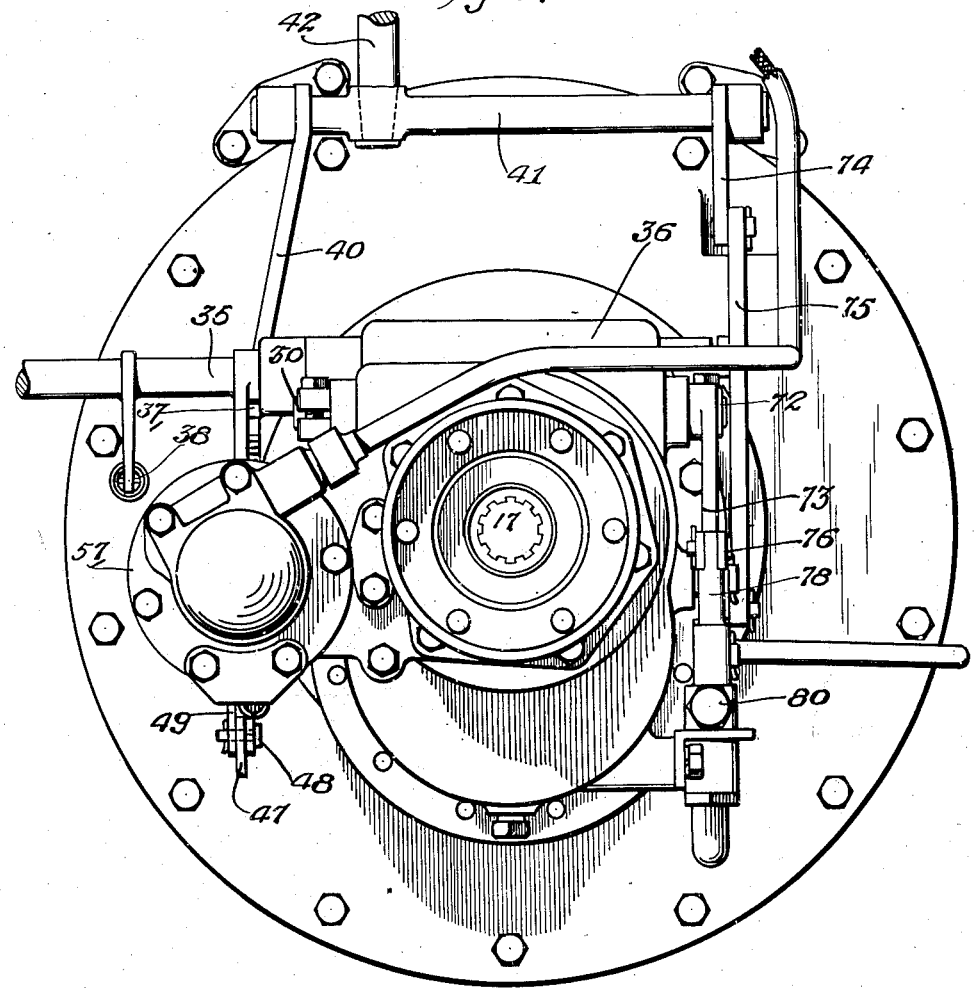
Inventor:—
Fred J. Ramsey
by his Attorneys
Hauson & Hauson Jan. 23, 1940.　　　F. J. RAMSEY　　　2,188,233
AUTOMATIC TRANSMISSION
Filed Nov. 9, 1937　　　11 Sheets-Sheet 5
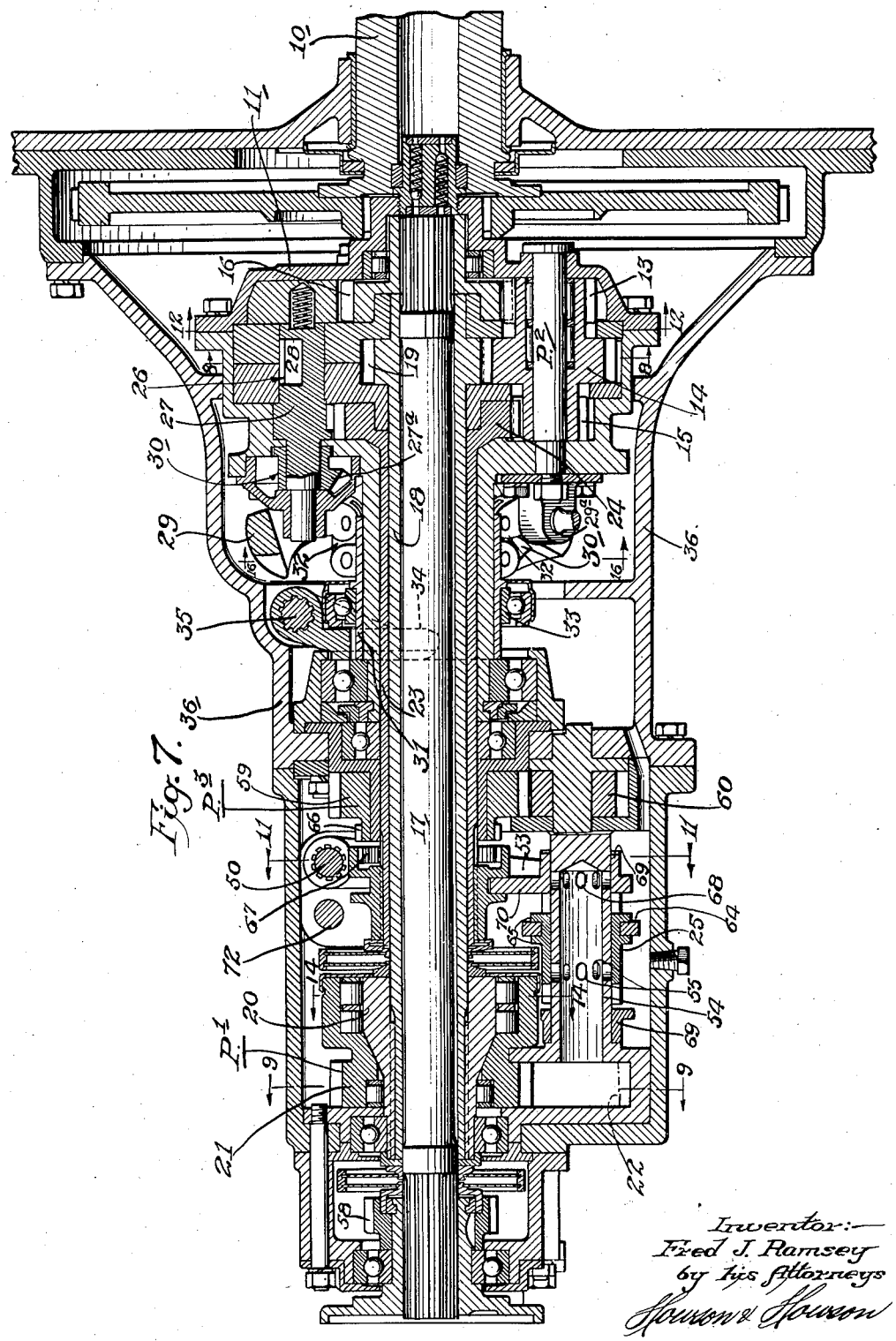
Inventor:—
Fred J. Ramsey
by his Attorneys
Lowson & Lowson

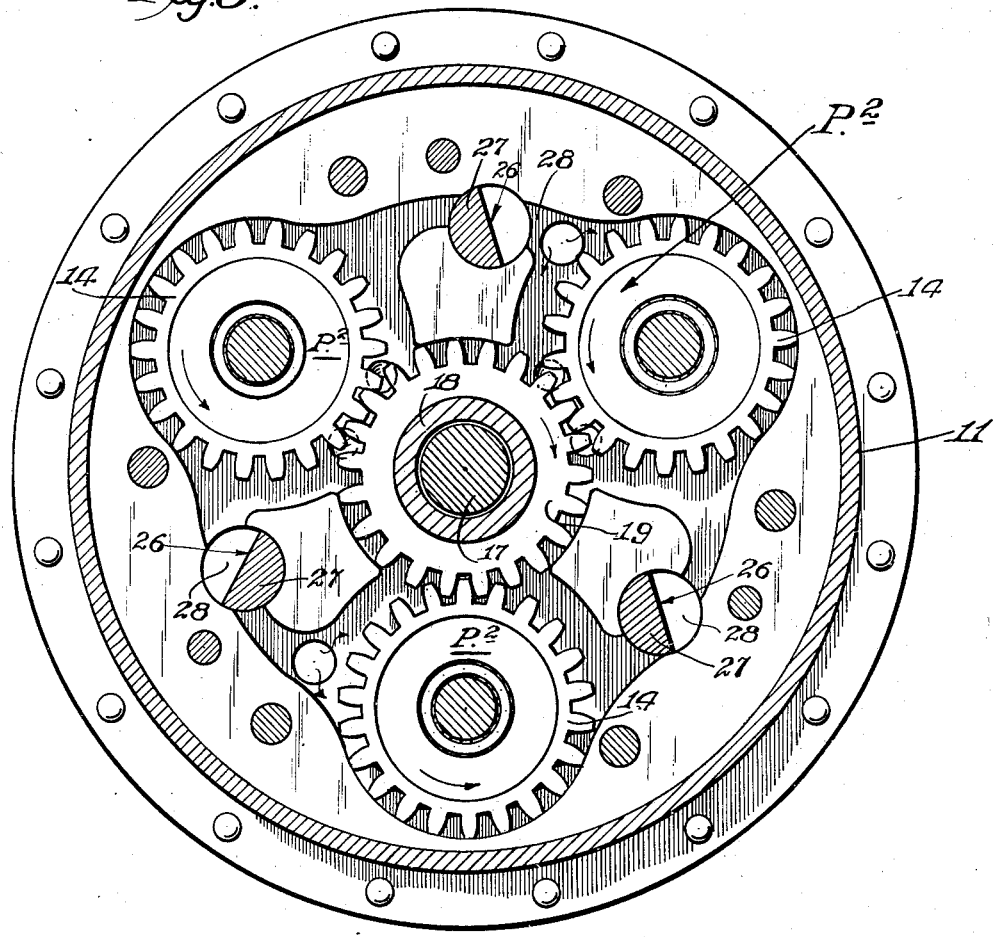

Jan. 23, 1940.     F. J. RAMSEY     2,188,233
AUTOMATIC TRANSMISSION
Filed Nov. 9, 1937     11 Sheets-Sheet 7
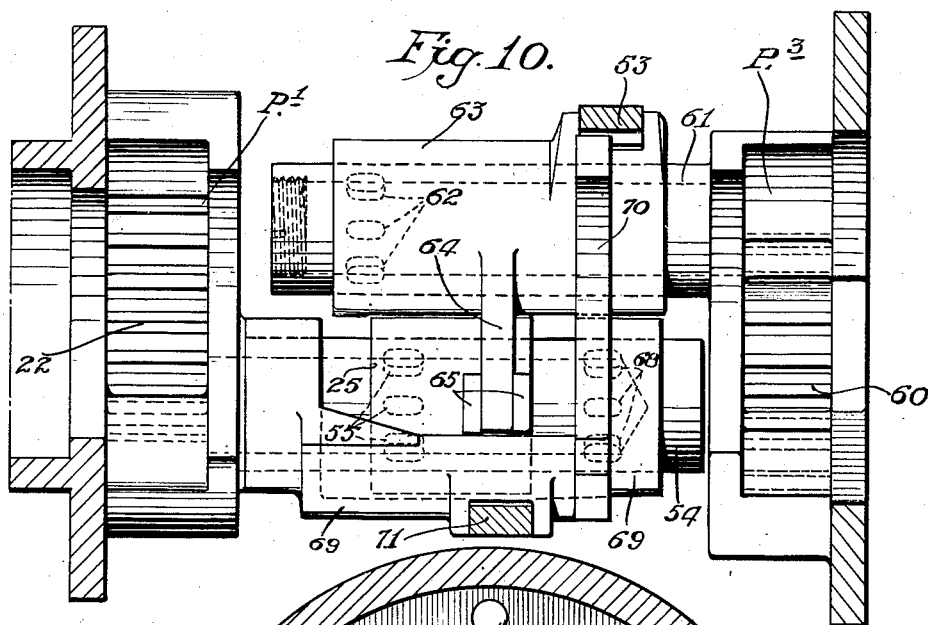
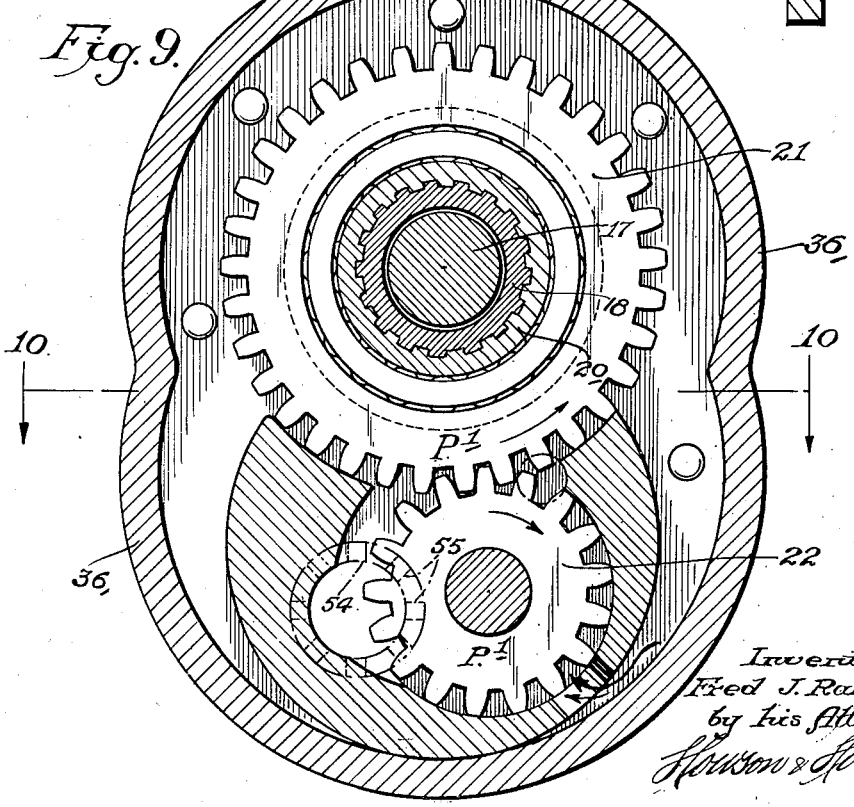

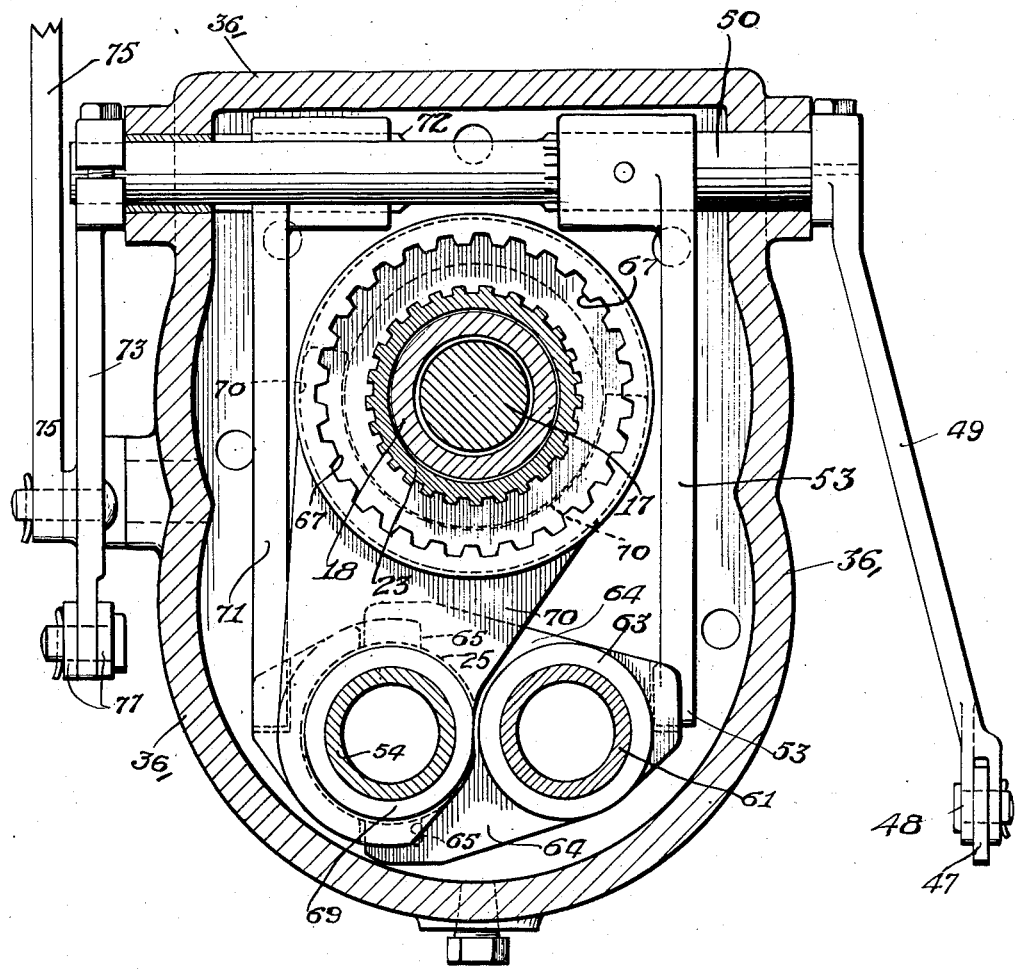

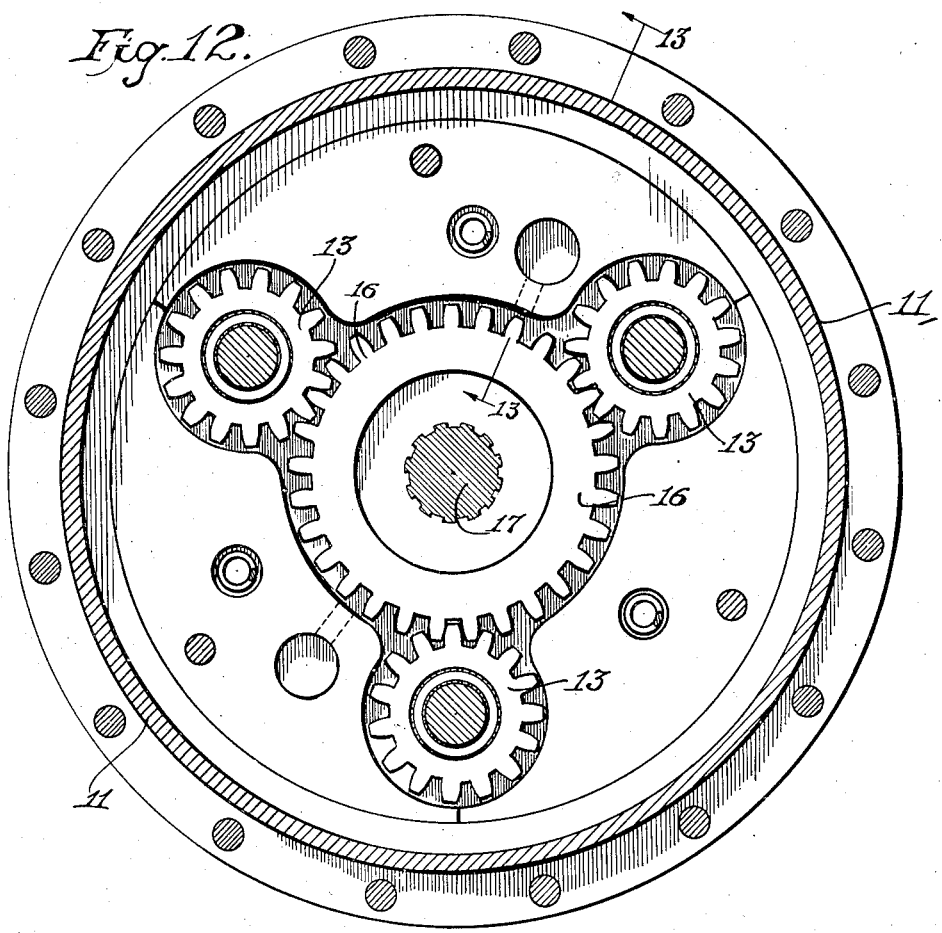
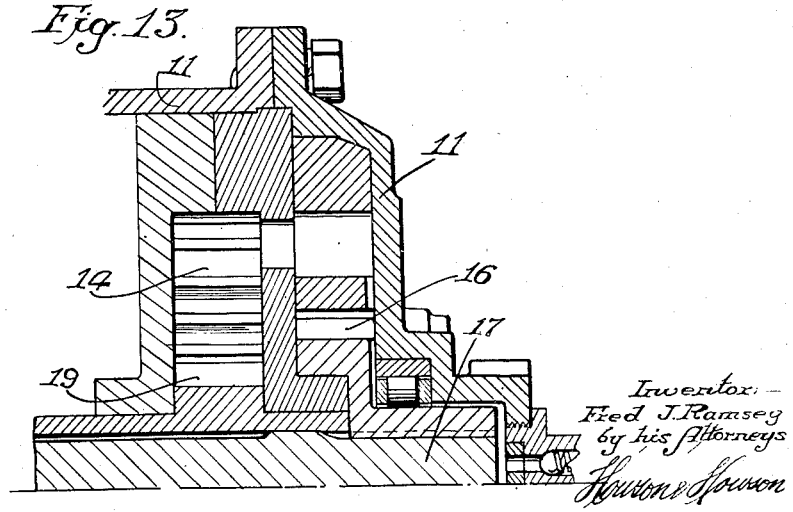

Jan. 23, 1940.　　　F. J. RAMSEY　　　2,188,233
AUTOMATIC TRANSMISSION
Filed Nov. 9, 1937　　11 Sheets-Sheet 10
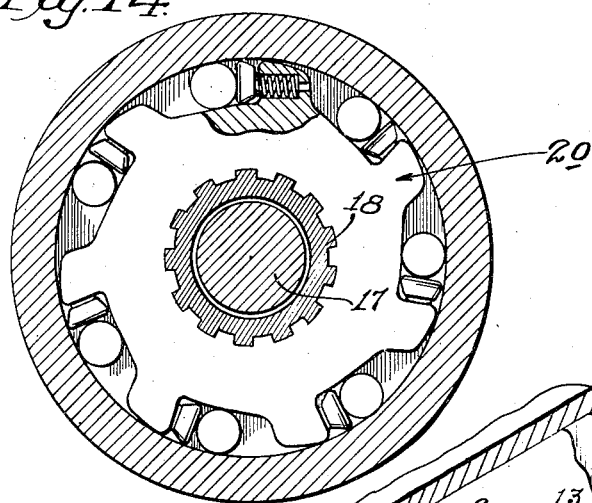
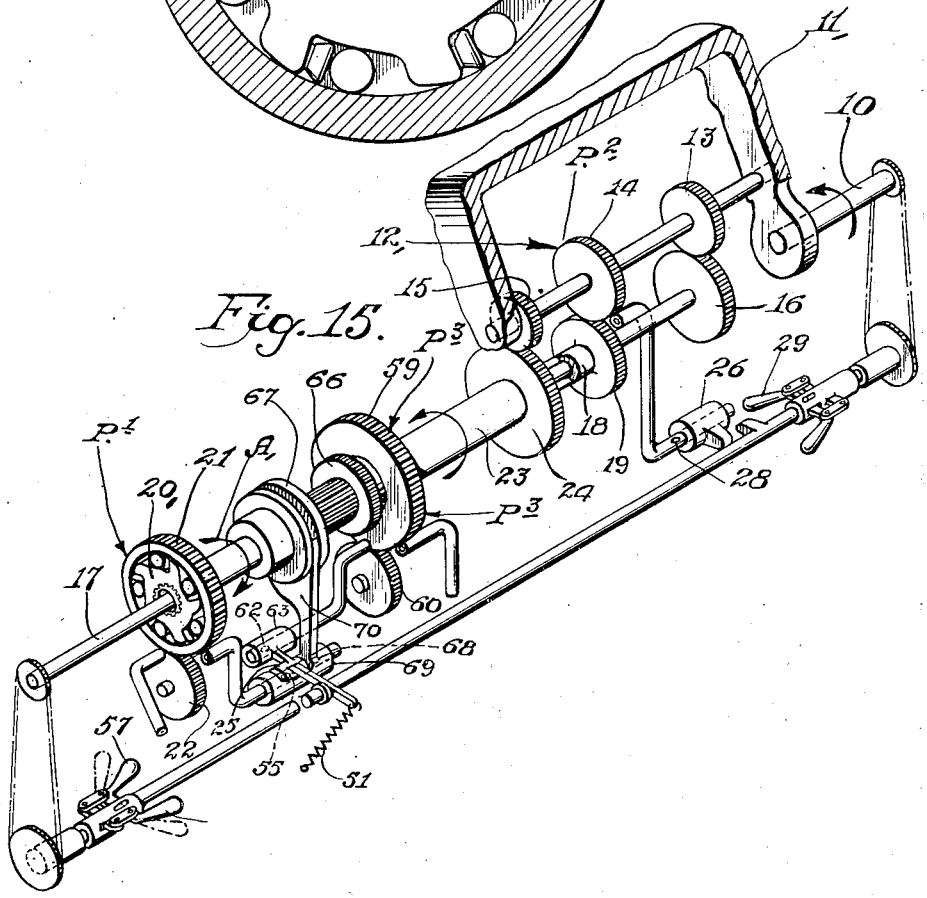
Inventor:-
Fred J. Ramsey
by his Attorneys
Howson & Howson Jan. 23, 1940. F. J. RAMSEY 2,188,233
AUTOMATIC TRANSMISSION
Filed Nov. 9, 1937 11 Sheets—Sheet 11

Inventor:—
Fred J. Ramsey,
by his Attorneys
Howson & Howson

Patented Jan. 23, 1940

2,188,233

UNITED STATES PATENT OFFICE 2,188,233

AUTOMATIC TRANSMISSION

Fred J. Ramsey, Harrisburg, Pa.

Application November 9, 1937, Serial No. 173,663

18 Claims. (Cl. 74—293)

This invention relates to an automatic transmission, and more particularly to a transmission of this character which is hydraulically controlled.

An important object of the invention is to improve the structure of my prior application, Serial No. 105,579, filed October 14, 1936, for "Hydraulic transmission", and more particularly to incorporate in a structure of the type shown in such application a hydraulically controlled reverse gear.

A further object of the invention is the simplification of the controls employed in such application.

A further and more specific object of the invention is the provision of a planetary transmission, operation of which is under control of governors operated by the input and output shafts which cooperate to control transition from one speed range to another without necessitating any manual control by the operator.

These and other objects I attain by the construction shown in the accompanying drawings wherein, for the purpose of illustration, I have shown a preferred embodiment of my invention and wherein:

Fig. 1 is a plan view partially in section of a transmission constructed in accordance with my invention;

Fig. 2 is a right side elevation of the transmission;

Fig. 3 is a left side elevation of the transmission illustrating in dotted lines the position of the control levers when the transmission is prepared for reverse action, and in solid lines the position of the transmission control levers during low or high speed operation;

Figs. 4 and 5 are fragmentary elevations of the control levers showing the positions for neutral and reverse;

Fig. 6 is an end elevation of the transmission;

Fig. 7 is a longitudinal sectional view therethrough;

Fig. 8 is a section on line 8—8 of Fig. 7;

Fig. 9 is a section on line 9—9 of Fig. 7;

Fig. 10 is a section on line 10—10 of Fig. 9;

Fig. 11 is a section on line 11—11 of Fig. 7;

Fig. 12 is a section on line 12—12 of Fig. 7;

Fig. 13 is a section on line 13—13 of Fig. 12;

Fig. 14 is an enlarged section on line 14—14 of Fig. 7;

Fig. 15 is a diagrammatic view illustrating the operation of the transmission;

Figure 16:
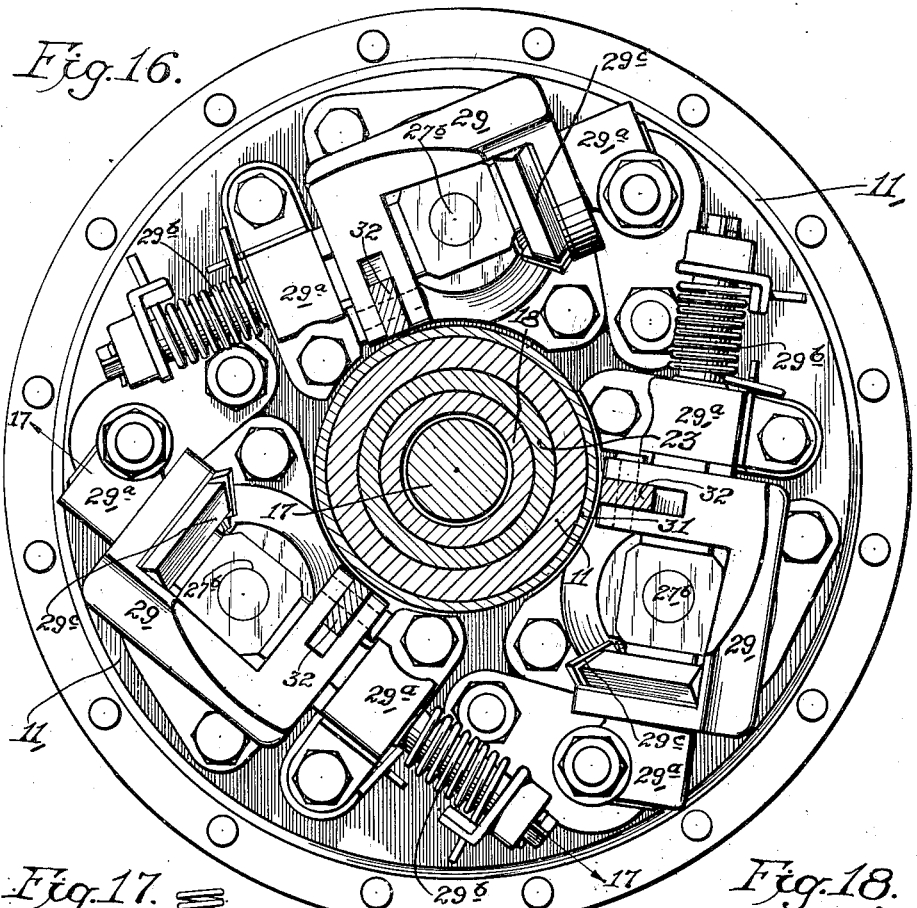
Fig. 16 is a section on line 16—16 of Fig. 7.
Figures 17, 18:
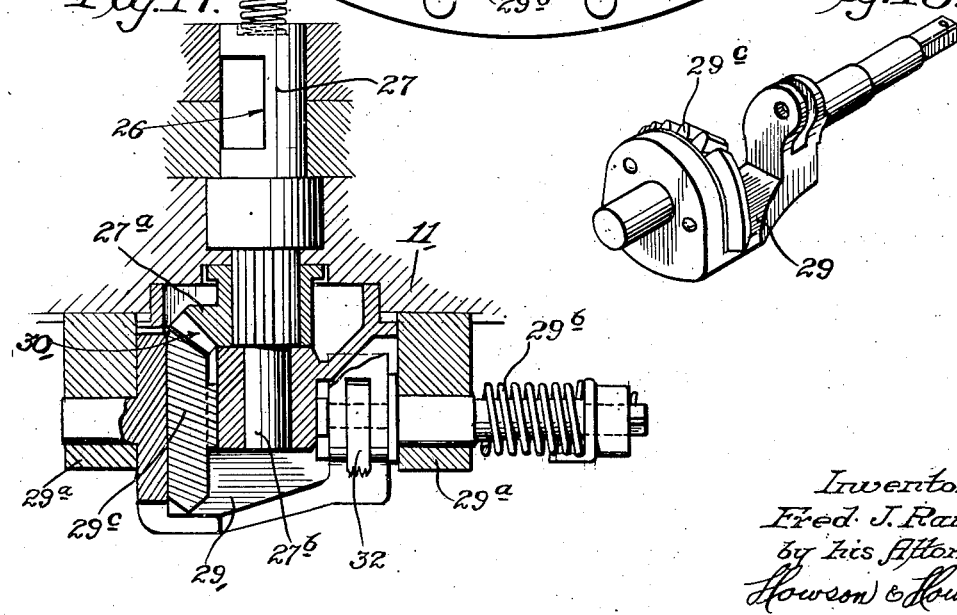
Fig. 17 is a fragmentary section on line 17—17 of Fig. 16.
Fig. 18 is a perspective view of one of the input governor weights.

Referring now to the drawings, and more particularly to the diagrammatic showing of Fig. 15, the numeral 10 generally designates a power shaft as, for example, the crank shaft of an internal combustion engine; 11, a housing driven thereby and supporting a plurality of planetary units 12. Each planetary unit comprises three pinions 13, 14, 15, of differing sizes, the pinion 15 being the smallest and the pinion 14 the largest of the group. The medium sized pinion 13 engages a gear 16 secured to the output shaft 17 of the transmission. A sleeve 18 rotatably surrounds the output shaft and has secured thereto a gear 19 meshing with the pinion 14. This sleeve, through an overrunning clutch 20, drives a gear pump comprising gears 21 and 22, the clutch being operative to connect the gear pump to the sleeve only when the sleeve is operating in a direction opposed to the direction of rotation of the drive shaft 10. The pinions 14 and their associated gear 19 comprise a second gear pump. Obviously, by interrupting the flow of the gear pump compressed by gears 21, 22, the rotation of sleeve 18 in the direction of arrow A may be checked and under these circumstances, since the gear 19 is smaller than the gear 16 secured to shaft 17, shaft 17 will be rotated in the same direction as the shaft 10 but at a much slower speed. If, at this time, the output of the pump formed by the pinions 14 and gear 19 be checked, the planetary units 12 are held against rotation and, obviously, the entire structure will rotate as a unit, this structure including not only the shaft 17, sleeve 18 and the planetary units, but likewise a sleeve 23 rotatably surrounding sleeve 18 and provided with a gear 24 meshing with pinion 15.

The output of pump P—1 is controlled through a valve 25, and that of the pump P—2, or main pump, through valves 26, the structure just described being, with the exception of pinion 15, gear 24 and shaft 23, that of my prior application above noted.

The valves 25, 26 are controlled as follows: Valves 26 comprise rotatable plugs 27 of the type described in my prior application above noted, each being adapted to obstruct a circulation passage 28 in the pump P—2 and each being controlled through an oscillatory governor weight 29 through segmental gearing generally designated at 30. The governor weights 29 are mounted in bearings 29a and oscillation thereof is resisted by individual governor springs 29b. Oscillation of the governor weights when it takes place is transmitted through a segmental gear 29c mounted directly on the governor weight and a segmental pinion 27a secured to the stem 27b of the plug valve.

A sleeve 31 surrounding a tubular extension of the housing 11, which extension in turn rotatably surrounds the sleeve 23, is linked at 32 to the oscillatory weights in such manner that it is forced rearwardly. As the governor weights move outwardly under centrifugal force, through a thrust bearing 33, this sleeve engages a fork 34 mounted on a shaft 35 extending through the wall of a stationary casing 36 containing the mechanism being described. Upon this shaft at the exterior of the casing are secured a bell crank lever 37, see Fig. 3, and a bias spring 38 which tends to oppose movement of the governor elements through the shaft 35 and the fork 34 and to constantly tend to rotate the bell crank lever in the direction of the arrow of Fig. 3. One arm 39 of the bell crank lever 37 coacts with a manually shiftable arm 40 controlled through a rock shaft 41 to which it is secured and a shifting lever 42. The lower end of the arm 40 has a projecting lug 43 which lug may, in one of three positions which the lever may assume, be so disposed as to clear entirely a coacting lug 44 on the arm 39, this position being the position of the arm 40 occupied during all forward speed movements. In a second, or neutral position, the lug 43 is caused to underlie the lug 44 and thus positively prevent movement of the bell crank lever in a direction opposed to the direction of the arrow of Fig. 3. It will be noted that the upper end of the lug 43 in this position engages in a notch 43a in lug 44, this serving to prevent movement of lever 42 when the speed of the input shaft is higher than desirable for gentle starting. It will be noted that this engagement of the lug in the notch 43a cannot be released until the speed of the input has been reduced to such a low point that the lever 37 is entirely under control of spring 38 and has its arm 39 in its most elevated position, thus change from neutral to reverse can only be effected at low input speeds. In yet a third, or reverse position, illustrated in Fig. 5, and in dotted lines in Fig. 3, the lug overlies an extending shoulder 45 on lug 44 and in this position the downward movement of arm 39 is limited by engagement of this shoulder with the lug 44.

In the operation now to be described, the lever 40 will be considered in its high position, or that shown by solid lines in Fig. 3. The second arm 46 of the bell crank lever 37 has connected thereto a link 47, the opposite end of which has pin and slot engagement at 48 with the lower end of an arm 49 secured to a shaft 50. A spring 51 normally tends to maintain a pin 52 of the arm 49 at the rear end of the slot of link 47. Spring 51 is a light spring and at low input speeds is overcome by spring 38 which restores the parts at such speeds to the dotted line position in Fig. 3. Shaft 50, within the casing 36 is provided with a shifting arm 53 operatively engaging the valve 25 in a manner hereinafter to be more fully described, this valve constituting simply a sleeve surrounding a tubular outlet 54 for pump P—1 and said sleeve controlling ports 55 formed in such outlet. The arm 46 of bell crank lever 37 engages the movable head 56 of a governor 57, such governor being driven by the output shaft 17 through gears 58 and 58a.

Assuming shaft 17 to be at a standstill and the shaft 10 to be in operation, since gear 19 is smaller than the gear 16, sleeve 18 will be set in motion rotating in the opposite direction from the direction of rotation of the shaft 10. With the arm 40 in the position shown in solid lines in Fig. 3, if the engine is speeded up the governor weights 29 will be urged outwardly, thus causing oscillation of the bell crank lever 37 in a direction opposed to that of the arrow of Fig. 3, this oscillation continuing until the arm 46 comes in contact with the head 56 of the governor which at that time will be in the dotted line position of Fig. 3. This will permit the arm 49 to move through its full throw, moving the valve 25 to the position where it closes ports 55 and obstructs the discharge of pump P—1, further movement of arm 46 being prevented by the governor head and that of arm 49 by internal structure limiting its movement. This action will stop motion of the sleeve 18 and, due to the fact that gear 19 is smaller than gear 16, shaft 17 will be rotated in the same direction as the direction of rotation of shaft 10 and at a reduced speed. When a predetermined speed of the output shaft is attained, the governor 57, which until this time has held sleeve 31 in an intermediate position and, accordingly, prevented operation of valves 26 to close the passages 28, begins to withdraw its head 56 and with increasing speed to finally permit the governor weights 29 to completely close valves 26, thus locking the planetary units 12 against rotation and causing the entire structure to rotate as a unit. It will be noted that the governor weights 29 comprise a centrifugal means driven by the power shaft for controlling valves 25 and also sharing the control of valves 26 with the output driven governor 57.

Rotatable about sleeve 23 is a gear unit 59 which, with a coacting pinion 60, comprises a gear pump P—3 having a discharge outlet 61 paralleling the outlet 54 of pump P—1 and provided with escape ports 62 controlled by a sleeve valve 63. Sleeve valve 63 is directly engaged by the lower end of the shifting arm 53 and has a projecting arm 64 engaging between upstanding lugs 65 on sleeve valve 25 so that these two valves are moved simultaneously and in the same direction to close the discharge ports of the several outlets of their respective pumps.

Gear 59 likewise comprises the male member 66 of a jaw clutch, the female member 67 of which is splined upon the sleeve 23. The outlet of pump P—1 has a second group of discharge ports 68 controlled by sleeve valve 69, which sleeve valve has a fork 70 engaging the member 67 of the clutch so that these two elements shift simultaneously. The sleeve valve 69 is engaged by the lower end of an arm 71, the upper end of which is secured to a shaft 72 which projects through the casing and is there equipped with a depending arm 73. The arm 73 is, in common with arm 40, controlled by shaft 41, the shaft being at present disclosed as having a short arm 74 connected to arm 73 intermediate the ends thereof through a link 75. The arm 73, through its connections with shaft 41 will, when the shaft is in its third position, i. e., that in which the shoulder 45 of lug 44 overlies the lug 43 of arm 40, so position arm 71 that the ports 68 are uncovered and at the same time the jaw clutch 66, 67 is engaged, thus disabling pump P—1 and throwing pump P—3 into operation. At this time, since the speed of the engine is low, the pump operates idly and will continue to do so until, through the input governor comprising the governor weights 29, the valve 63 is shifted to cover the ports 62, at which time the pump acts as a brake to stop rotation of sleeve 23. Since the gear 24 exceeds in size gear 16, shaft 17 will now be driven in the reverse direction to that of the shaft 10. It will be noted that the co-action of lugs 43, 44, at this time serves to so position valve 26 that pump P—2 operates idly.

In order to control the position of shaft 41 and the operating lever 42 therefor, I mount upon the casing 36 a bell crank lever 76 one arm of which is linked to the lower end of arm 73 as at 77 and the other arm of which operates a plunger 78 provided with notches 79 engaged by the spring-pressed detent 80, notches 79 corresponding to the three operative positions of the lever 42 and maintaining the link and lever connections associated therewith in a preselected position. It will be noted that the transmission is entirely automatic with the exception of this preselection, all other operations being controlled by acceleration of the input shaft 10 and the orbit element formed by the casing 11.

It will, of course, be obvious that as the input speed decreases the reversal of the operations hereinbefore described takes place in the reverse sequence; in other words, assuming the vehicle to be travelling at high speed, a predetermined reduction of this speed will cause governor 57 to act upon lever 46 and reopen valves 27, thus throwing the pump P—2 out of effective operation, a further reduction finally shifting valve 26 and disabling pump P—1.

Since the construction as herein illustrated is, obviously, capable of considerable modification without in any manner departing from the spirit of my invention, I do not wish to be understood as limiting myself thereto except as hereinafter claimed.

I claim:

1. In a transmission, a driven orbit element, two gears, a rotatable planet unit rotating with said orbit element and including a pinion for and engaging each of said gears, a gear pump, a driving connection between the gear pump and one of said gears, a valve to interrupt discharge from the gear pump, means to brake rotation of said planet unit comprising a gear pump including one of said gears and the coacting pinion of said planet unit and a valve controlling the discharge of said pump, and centrifugally operated means to sequentially close the valves of said gear pumps.

2. In a transmission, a driven orbit element, two gears, an output shaft driven by one of the gears, a rotatable planet unit rotating with said orbit element and including a pinion for and engaging each of said gears, a gear pump, a driving connection between the gear pump and the other of said gears, a valve to interrupt discharge from the gear pump, means to brake rotation of said planet unit comprising a gear pump including one of said gears and the coacting pinion of said planet unit, and a valve controlling the discharge of said pump, centrifugally operated means operated by the speed of rotation of the orbit element to sequentially close the valves of said gear pumps in the order named, and means to prevent said centrifugally operated means from closing the valve of the last-named gear pump until the output shaft has attained a predetermined speed.

3. In a transmission, a driven orbit element, two gears, a rotatable planet unit rotating with said orbit element and including a pinion for and engaging each of said gears, a gear pump, a driving connection between the gear pump and one of said gears, a valve to interrupt discharge from the gear pump, means to brake rotation of said planet unit comprising a gear pump including one of said gears and the coacting pinion of said planet unit and a valve controlling the discharge of said pump, centrifugally operated means to sequentially close the valves of said gear pumps, and means to disable said centrifugally operated means.

4. In a transmission, a driven orbit element, two gears, an output shaft driven by one of the gears, a rotatable planet unit rotating with said orbit element and including a pinion for and engaging each of said gears, a gear pump, a driving connection between the gear pump and the other of said gears, a valve to interrupt discharge from the gear pump, means to brake rotation of said planet unit comprising a gear pump including one of said gears and the coacting pinion of said planet unit, and a valve controlling the discharge of said pump, centrifugally operated means operated by the speed of rotation of the orbit element to sequentially close the valves of said gear pumps in the order named, means to prevent said centrifugally operated means from closing the valve of the last-named gear pump until the output shaft has attained a predetermined speed, and means to disable said centrifugally operated means.

5. In a transmission, a driven orbit element, two gears, a rotatable planet unit rotating with said orbit element and including a pinion for and engaging each of said gears, a gear pump, a driving connection between the gear pump and one of said gears including a clutch, a valve to interrupt discharge from the gear pump, means to brake rotation of said planet unit comprising a gear pump including one of said gears and the coacting pinion of said planet unit and a valve controlling the discharge of said pump, centrifugally operated means to sequentially close the valves of said gear pumps, means to limit operation of said centrifugally operated means to actuation of the valve of the first-named gear pump and means to engage said clutch.

6. In a transmission, a driven orbit element, two gears, an output shaft driven by one of the gears, a rotatable planet unit rotating with said orbit element and including a pinion for and engaging each of said gears, said gears being so proportioned that braking of one thereof causes rotation of the output shaft in a direction opposite to the direction of rotation of the orbit element, a gear pump, a driving connection between the gear pump and said gear including a clutch, a valve to interrupt discharge from the gear pump, means to brake rotation of said planet unit comprising a gear pump including one of said gears and the coacting pinion of said planet unit, and a valve controlling the discharge of said pump, centrifugally operated means operated by the speed of rotation of the orbit element to sequentially close the valves of said gear pumps in the order named, means to prevent said centrifugally operated means from closing the valve of the last-named gear pump and means to engage said clutch.

7. In a transmission, a driven orbit element, two gears, a rotatable planet unit rotating with said orbit element and including a pinion for and engaging each of said gears, a gear pump, a driving connection between the gear pump and one of said gears including a clutch, a valve to interrupt discharge from the gear pump, means to brake rotation of said planet unit comprising a gear pump including one of said gears and the coacting pinion of said planet unit and a valve controlling the discharge of said pump, centrifugally operated means to sequentially close the valves of said gear pumps, means to limit operation of said centrifugally operated means to actuation of the valve of the first-named gear pump, means to engage said clutch, and means to disable said centrifugally operated means.

8. In a transmission, a driven orbit element, two gears, an output shaft driven by one of the gears, a rotatable planet unit rotating with said orbit element and including a pinion for and engaging each of said gears, said gears being so proportioned that braking of one thereof causes rotation of the output shaft in a direction opposite to the direction of rotation of the orbit element, a gear pump, a driving connection between the gear pump and said gear including a clutch, a valve to interrupt discharge from the gear pump, means to brake rotation of said planet unit comprising a gear pump including one of said gears and the coacting pinion of said planet unit, and a valve controlling the discharge of said pump, centrifugally operated means operated by the speed of rotation of the orbit element to sequentially close the valves of said gear pumps in the order named, means to prevent said centrifugally operated means from closing the valve of the last-named gear pump, means to engage said clutch, and means to disable said centrifugally operated means.

9. In a transmission, a driven orbit element, three independently rotatable gears, a rotatable rigid planet unit rotating with the orbit unit and comprising a pinion for and engaging each gear, means to brake rotation of the planet unit including one of said gears, means to brake rotation of said gear, centrifugal operating means for said braking means, means to brake rotation of a second gear, an output shaft driven by the third gear and reversely operated when said second gear is braked, and means to disable said centrifugal means when said second gear is braked.

10. The device of claim 9 wherein the centrifugal operating means is driven by the orbit unit and successively actuates first the braking means of the first-named gear and then that of the planet unit.

11. The device of claim 9 wherein the centrifugal operating means is driven by the orbit unit and successively actuates first the braking means of the first-named gear and then that of the planet unit, and a second centrifugal means actuated by the output shaft prevents the first-named centrifugal means from actuating the braking means of the planet unit until the output shaft is rotating at a predetermined speed.

12. In a transmission, a driven orbit element, three independently rotatable gears of different sizes, a rotatable rigid planet unit rotating with the orbit unit and comprising a pinion for and engaging each gear, means to brake rotation of the planet unit including the smallest gear, means to brake rotation of said gear, centrifugal operating means for said braking means, means to brake rotation of the largest gear, an output shaft driven by the remaining gear and reversely operated when said largest gear is braked, and means to disable said centrifugal means when said largest gear is braked.

13. The device of claim 12 wherein the centrifugal operating means is driven by the orbit unit and successively actuates first the braking means of the first-named gear and then that of the planet unit.

14. The device of claim 12 wherein the centrifugal operating means is driven by the orbit unit and successively actuates first the braking means of the first-named gear and then that of the planet unit, and a second centrifugal means actuated by the output shaft prevents the first-named centrifugal means from actuating the braking means of the planet unit until the output shaft is rotating at a predetermined speed.

15. In a transmission, a driven orbit element, two gears, a rotatable planet unit rotating with said orbit element and including a pinion for and engaging each of said gears, a gear pump, a driving connection between the gear pump and one of said gears, a valve to interrupt discharge from the gear pump, means to brake rotation of said planet unit comprising a gear pump including one of said gears and the coacting pinion of said planet unit and a valve controlling the discharge of said pump, and centrifugally operated means to sequentially close the valves of said gear pumps, the relative sizes of said gears being such that the first-named gear rotates in one direction when the planet unit is free and in the opposite direction when the planet unit is braked, the connection between the first-named gear and its gear pump including an overrunning clutch.

16. In a transmission, a driven orbit element, two gears, and output shaft driven by one of the gears, a rotatable planet unit rotating with said orbit element and including a pinion for and engaging each of said gears, a gear pump, a driving connection between the gear pump and the other of said gears, a valve to interrupt discharge from the gear pump, means to brake rotation of said planet unit comprising a gear pump including one of said gears and the coacting pinion of said planet unit, and a valve controlling the discharge of said pump, centrifugally operated means operated by the speed of rotation of the orbit element to sequentially close the valves of said gear pumps in the order named, and means to prevent said centrifugally operated means from closing the valve of the last-named gear pump until the output shaft has attained a predetermined speed, the relative sizes of said gears being such that the first-named gear rotates in one direction when the planet unit is free and in the opposite direction when the planet unit is braked, the connection between the first-named gear and its gear pump including an overrunning clutch.

17. In a transmission, a driven orbit element, three independently rotatable gears, a rotatable rigid planet unit rotating with the orbit unit and comprising a pinion for and engaging each gear, means to brake rotation of the planet unit including one of said gears, means to brake rotation of said gear, centrifugal operating means for said braking means, means to brake rotation of a second gear, an output shaft driven by the third gear and reversely operated when said second gear is braked, and means to disable said centrifugal means when said second gear is braked, the relative sizes of said gears being such that the first-named gear rotates in one direction when the planet unit is free and in the opposite direction when the planet unit is braked, the connection between the first-named gear and its gear pump including an overrunning clutch.

18. In a transmission, a driven orbit element, two gears, a rotatable planet unit rotating with said orbit element and including a pinion for and engaging each of said gears, a gear pump, a driving connection between the gear pump and one of said gears, a valve to interrupt discharge from the gear pump, means to brake rotation of said planet unit comprising a gear pump including one of said gears and the coacting pinion of said planet unit and a valve controlling the discharge of said pump, centrifugally operated means to sequentially close the valves of said gear pumps, and means to disable said centrifugally operated means, the relative sizes of said gears being such that the first-named gear rotates in one direction when the planet unit is free and in the opposite direction when the planet unit is braked, the connection between the first-named gear and its gear pump including an overrunning clutch.

FRED J. RAMSEY.